United States Patent [19]

Weissing et al.

[11] Patent Number: 4,461,067
[45] Date of Patent: Jul. 24, 1984

[54] APPARATUS FOR MAKING LOCKING SEALING RINGS

[75] Inventors: Otto Weissing, Paoli, Pa.; Don C. Hill, St. Louis, Mo.

[73] Assignee: McQuay-Norris, Inc., St. Louis, Mo.

[21] Appl. No.: 363,126

[22] Filed: Mar. 29, 1982

[51] Int. Cl.$^3$ .............................................. B23P 23/00
[52] U.S. Cl. .................................. 29/564.1; 29/156.6; 29/156.63
[58] Field of Search .............. 29/156.63, 156.6, 33 Q, 29/564.1; 409/232, 219, 234; 51/215 R; 82/38 R

[56] References Cited

U.S. PATENT DOCUMENTS

| | | | |
|---|---|---|---|
| 1,429,419 | 9/1922 | Flammang | 409/232 X |
| 1,471,032 | 10/1923 | Johnson | 409/234 V |
| 1,475,661 | 11/1923 | Taylor | 409/219 X |
| 2,560,549 | 7/1951 | Bates | 82/38 R X |
| 2,697,865 | 12/1954 | Norton | 29/156.6 X |
| 2,925,849 | 2/1960 | Burns et al. | 29/33 Q X |
| 3,100,929 | 8/1963 | Nisper | 29/156.6 |
| 3,553,907 | 1/1971 | Price | 51/215 R |

*Primary Examiner*—William R. Briggs
*Assistant Examiner*—Glenn L. Webb
*Attorney, Agent, or Firm*—Eugene E. Renz, Jr.

[57] ABSTRACT

Apparatus and system for making positive locking sealing rings having interengagable ring end notches with mating surfaces thereof at closely precise angles of intersection. In a preferred form, interal notch end faces, and ring terminal ends, are parallel and disposed at a slight angle to the ring axis to provide a positive angular interlock between the notches in a free hooked condition. The term "free hooked" as used herein means latched but not confined in a final assembly. The rings, including notches and ring terminal ends, are formed automatically in the apparatus of the invention by a unitized multiple component or faced cutter, such as a milling cutter. The cutting surfaces and cutter unit for the angled face notch design are advanced at an angle to the ring axis equal to the angles of the notch face surfaces. The cutter element faces are so formed, disposed, and the cutter so controlled, preferably in a so-called single plunge notch cutting operation, as to insure a preserved uniform ring material section below the notch base for ring strength.

The machine used includes a ring blank loading station, two cutting stations for top and bottom hook cuts, a composite unloading-hooking station, a hooked ring catcher unit, and an index unit for transfer of parts under each station. A programmable controller function to control the operating cycle. Preferably, a circular design is used, although a linear configuration is possible.

11 Claims, 37 Drawing Figures

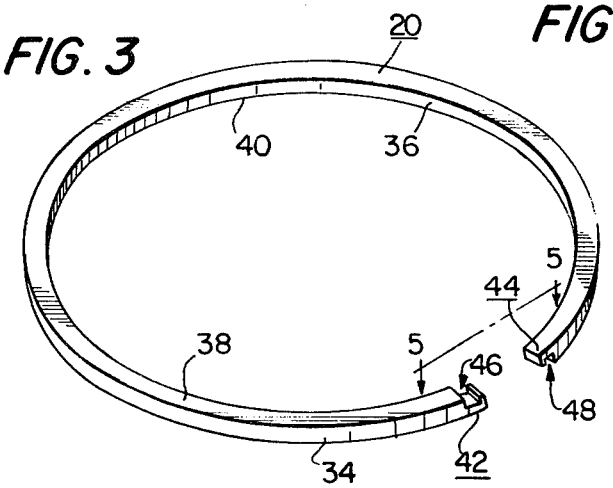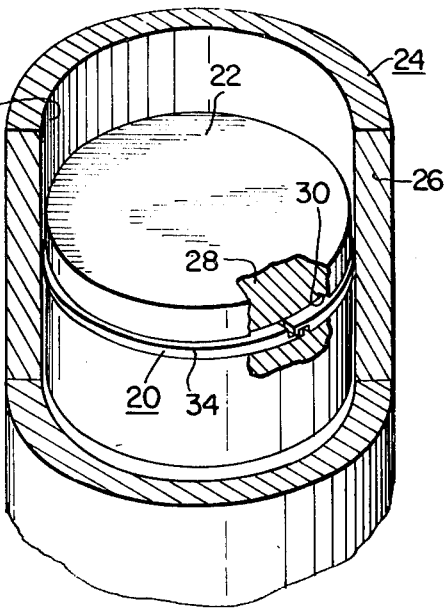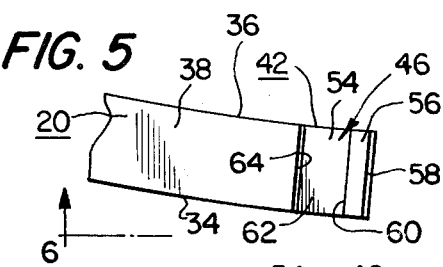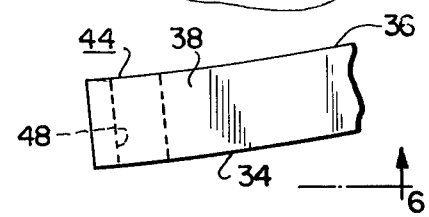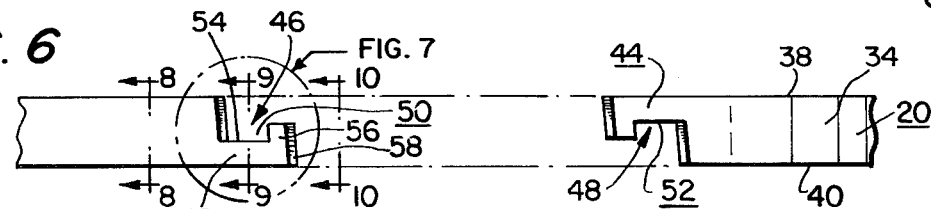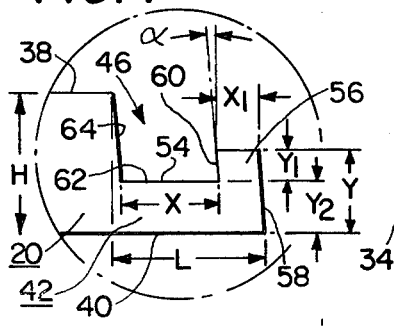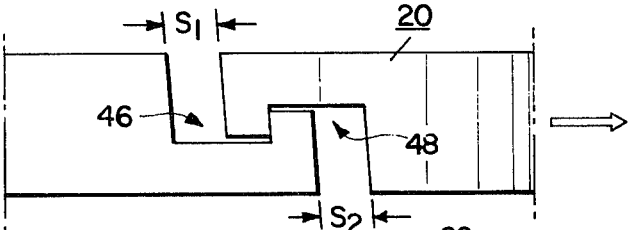

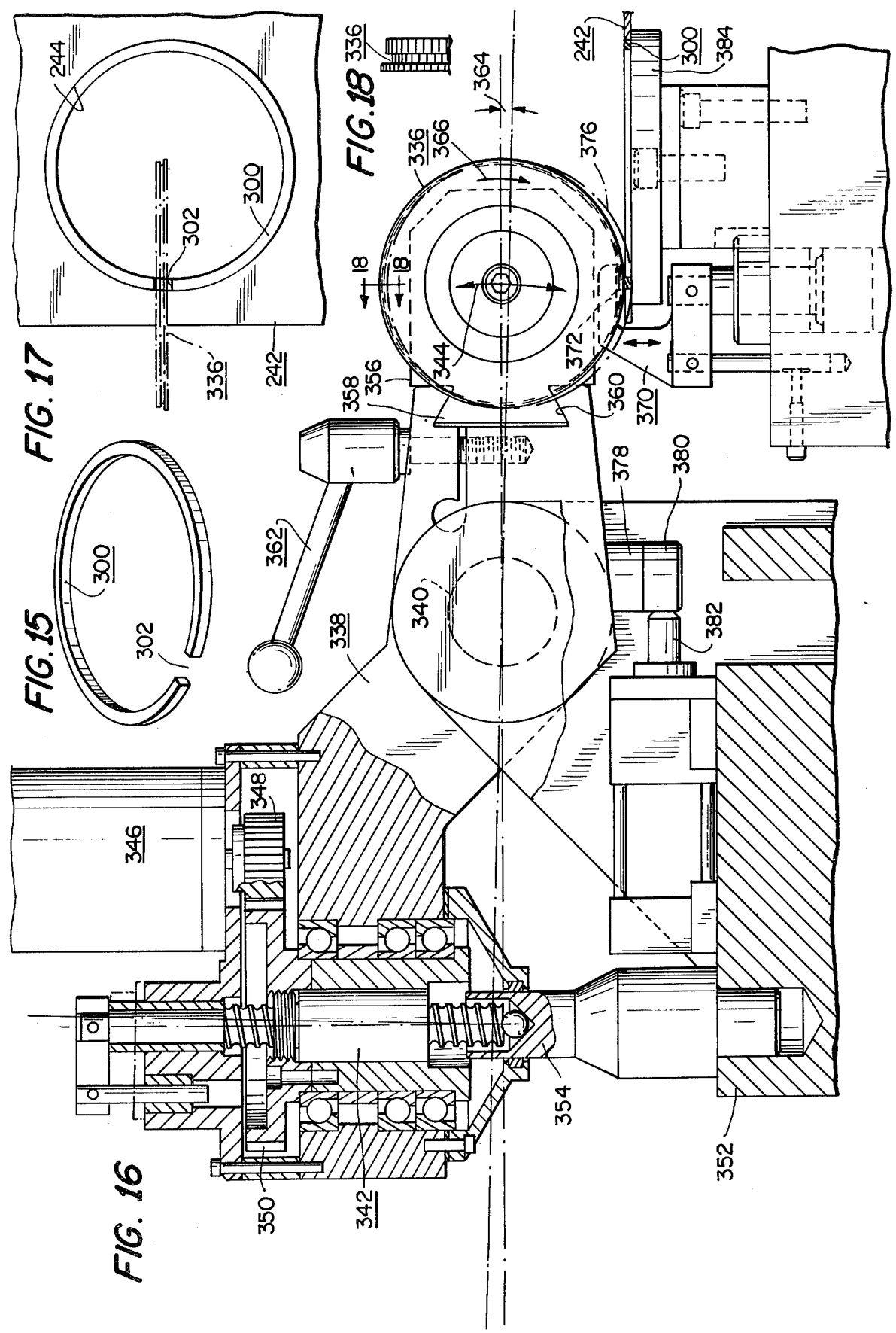

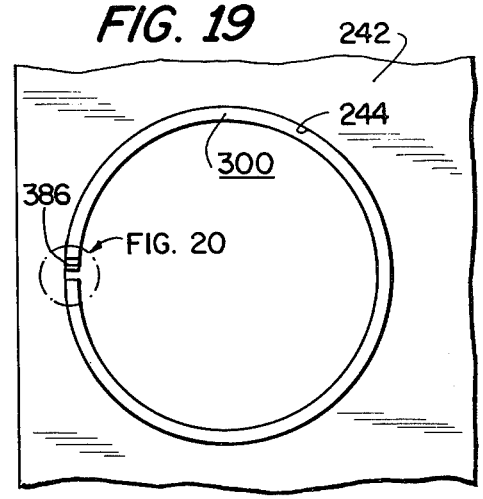
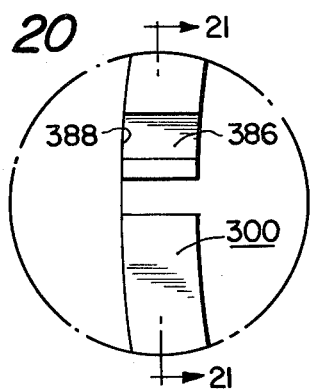
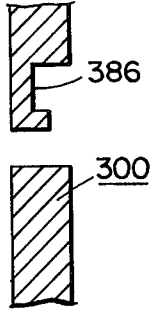
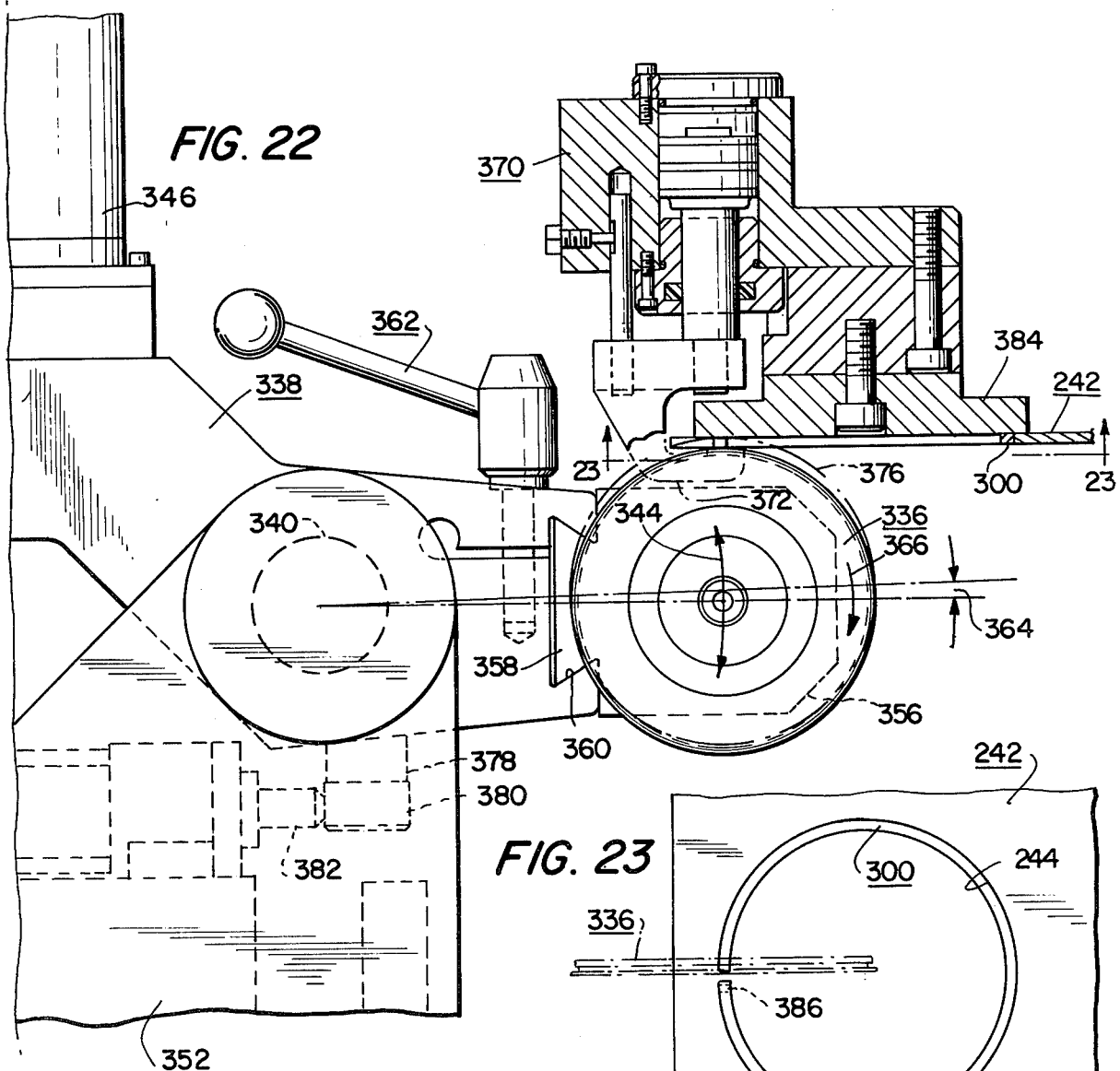
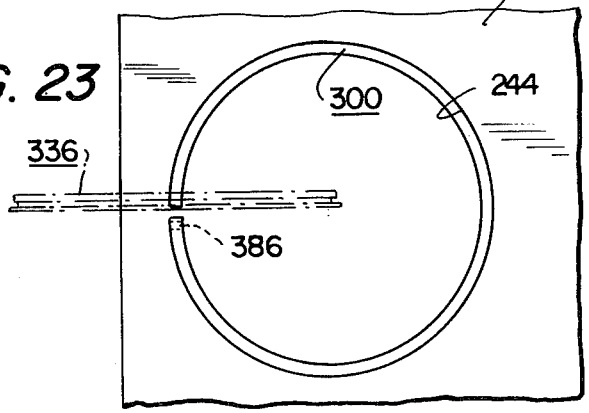

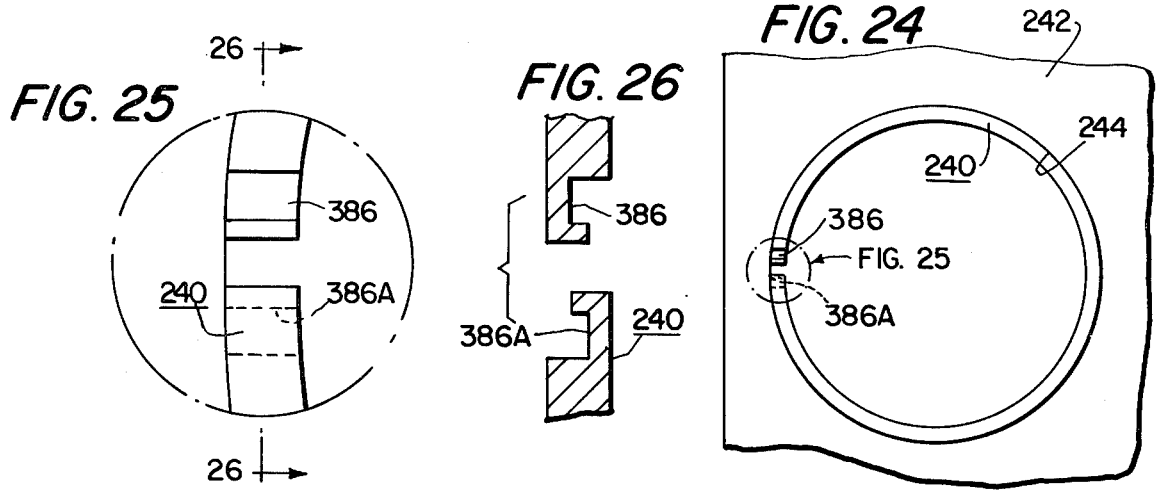
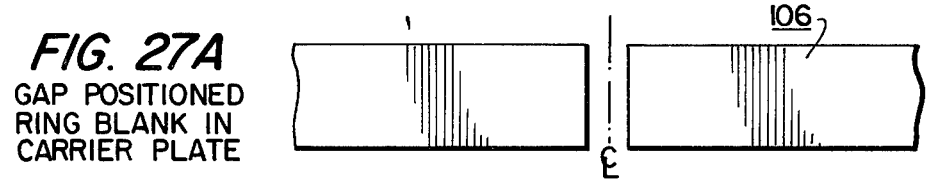
FIG. 27A
GAP POSITIONED
RING BLANK IN
CARRIER PLATE
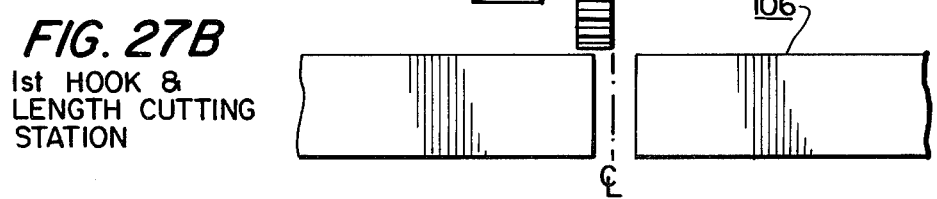
FIG. 27B
1st HOOK &
LENGTH CUTTING
STATION
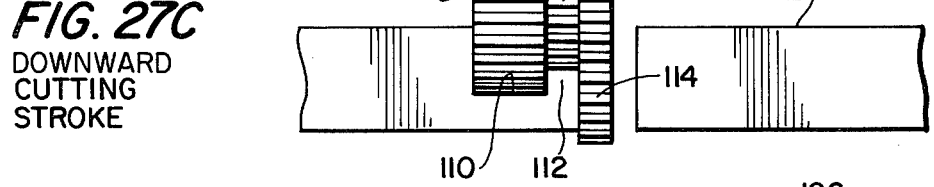
FIG. 27C
DOWNWARD
CUTTING
STROKE
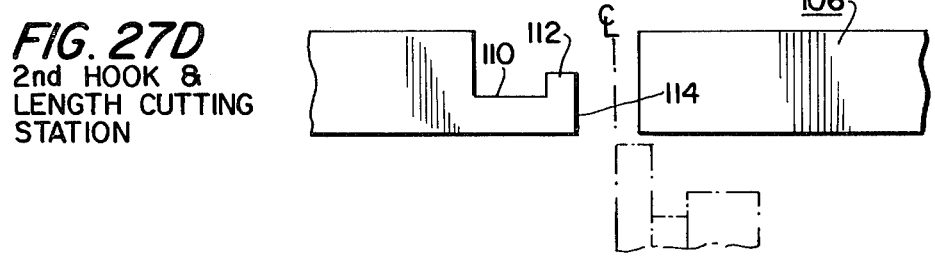
FIG. 27D
2nd HOOK &
LENGTH CUTTING
STATION

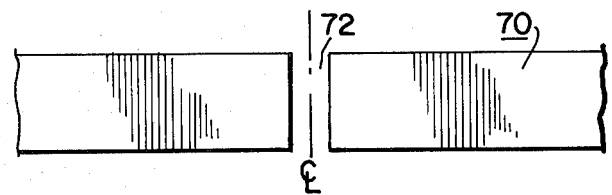
FIG. 28A
GAP POSITIONED RING BLANK IN CARRIER PLATE
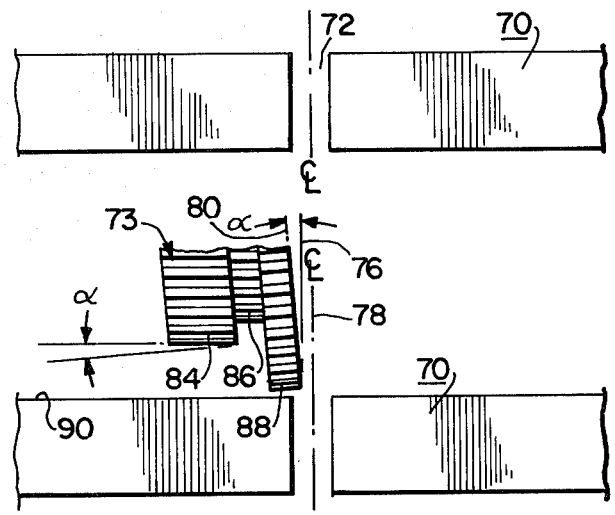
FIG. 28B
1st. HOOK & LENGTH CUTTING STATION
FIG. 28C
DOWNWARD CUTTING STROKE
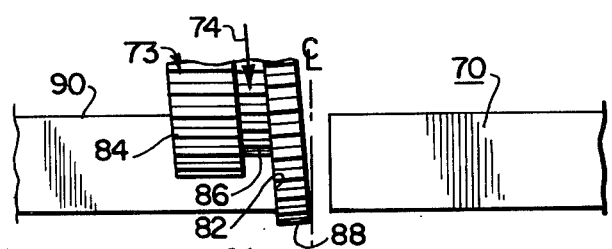
FIG. 28D
2nd. HOOK & LENGTH CUTTING STATION
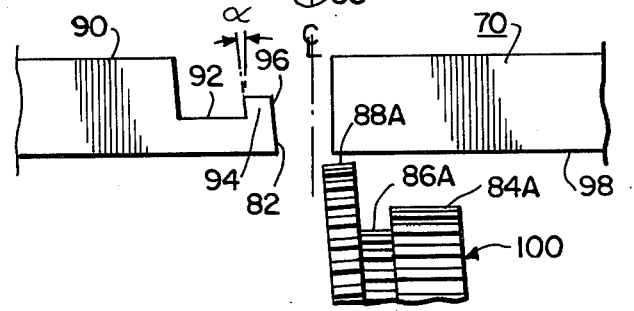
FIG. 28E
UPWARD CUTTING STROKE
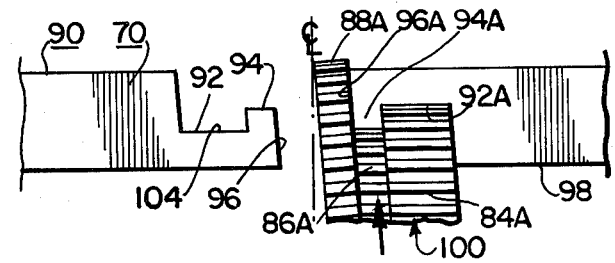
FIG. 28F
COMPLETED HOOK & LENGTH CUTTING
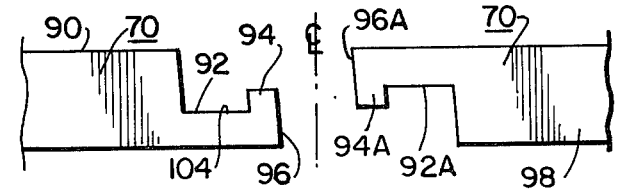
FIG. 28G
HOOK COUPLING & EJECTION TO DISCHARGE CHUTE
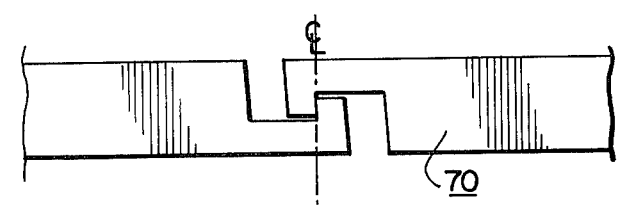

APPARATUS FOR MAKING LOCKING SEALING RINGS

TECHNICAL FIELD

The invention relates generally to sealing rings such as for use between relatively movable parts, for example pistons in cylinders, or movable shafts in casings, transmissions and the like. More particularly, the invention is directed to apparatus and a system for making such rings.

Rings of this type are normally split to provide opposite or opposed free ends and to permit at least initial mounting of the rings on structural elements with hookings in engagement in a latched but not final engagement. This is referred to as a "free-hooked" condition.

In order to more clearly understand the present invention, a preliminary discussion of such rings is felt desirable. Such a description is therefore included in the application in fairly substantial detail.

Some such rings for assembly purposes require a positive final latching or locking together of the ring ends. While locking ends of conventional sealing rings are known, they have primarily consisted of interengaging, or interlocking, faces perpendicular to the axis of the ring.

Another type of sealing ring having end locking means has utilized sloping or angularly disposed interengaging faces in notches in facing axial surfaces at opposed ends of the ring. The structural features of these latter prior rings, however, include a weakened section in the ring body in the location of the interengaging notches, due to the method necessarily utilized in formation of the notches. It has also been difficult to obtain desired sufficiently exact end clearance relations in prior known ring structures.

The underlying principles and concept of the present invention for positive locking sealing rings are the results of a particular new and novel method, apparatus and system for formation of the notches. Special apparatus has been designed to accomplish or perform the method. The present application and invention is accordingly directed to a particular method for forming the ring structure, setting out in detail the principles and features thereof, and the means to accomplish this. The locking sealing ring, as an end article of manufacture, and a method, constitute the subject matter of separate applications.

BACKGROUND OF THE INVENTION

As well known in the art, sealing rings for disposition between relatively moving parts of mechanisms have long been known and used. Such rings have been used, for example, on pistons in cylinders of internal combustion engines, movable shafts in casings, transmissions and the like.

The precise construction of the rings have varied substantially and primarily with respect to the ring ends. Such ring ends have included abutting faces formed ar right angles to the axis of the ring, slanted end faces adapted for interengagement, and various means have been provided on, or proximate, the ring ends to operatively interlock the ends when assembled on a part to prevent its displacement therefrom subsequent to mounting, and also during pre-assembly of a mechanism incorporating a part having such sealing ring.

In some known constructions having interengaging notches in the ring ends and even in types having sloping faces in the notches for interengagement, there have been weakened sections or portions in the ring material below the formed notches or cuts due to removal of ring body material in formation of the notches. An example of this particular type of construction is disclosed in prior British Pat. No. 1,406,375, issued Sept. 17, 1975 to Nippon Piston Ring Co., Ltd. The ring construction shown in this patent has the inherent drawback which can result in breakage or distortion in use due to the weakened area resulting from formation of the notch. It is also difficult in this prior ring construction to provide desired clearance tolerances in application and use. While basically the British patent discloses a split-ring having notches formed in the ends which can be interengaged to prevent the ring from springing open when the ring is inserted in a bore, for example, and contact faces of the locking ends are inclined at an angle from the axis of the ring, the ring disclosed in the patent has disadvantages and defects which delete, either completely, or partially, the effective end use of such a ring. These drawbacks and defects in the prior ring flow primarily from the method of their manufacture and the mechanism or machinery for manufacturing the same.

Initially, it is pointed out that the ring construction shown in the British patent requires a plurality of separate machine operations to form the hooks, and to appropriately trim the ring ends. The method utilized basically includes a plurality of cutters which are sequentially traversed with respect to the ring blank, each separate cutting member, upon movement, serving to form a particular portion of the notch. It will be noted that the base of the notch so formed has an angular or triangularly shaped notch therein intermediate the ends of the base surface. This construction provides a weakened area or section in the finalized ring.

The method wherein the cutters and machining cycle utilized require advancing of plural separate cutting or milling members at different times, in different parts of the cycle, can adversely affect the end clearance variation if the setup is not precisely exact. Under some manufacturing steps used in forming such a construction, it is possible that inertia forces, caused by movement of a carrier utilized in manufacture of the ring, can cause the ring ends to move out of a desired position, and possibly result in additional variation of desired end clearances. It is therefore to be noted that in the final hook configuration of the ring of this British patent, as shown, the end clearance is in actuality larger than required, and this can allow excessive leakage when in an installed, operative position in different mechanisms with which used.

Other configurations of interlocking end rings have incorporated drawbacks wherein angles of mating faces are too steep, or have the angles of interconnection therebetween rounded, and having radii of such dimentions as to allow the rings to become unhooked, causing the rings to break during assembly into cylinders or the like. This drawback primarily is related to a construction wherein the faces of the notch are substantially perpendicular to one another.

It is also known that a multiple number of cutting steps required can result in inaccuracies through wear and misalignment. Manifestly, plural steps also severely effect manufacturing time and, accordingly, costs involved.

Prior known and used types of sealing rings, their methods of manufacture, and apparatus for their production have not been entirely satisfactory in use.

Prior drawbacks and problems are overcome by the concepts involved in the present invention, and particularly in the form where the interengaging and interacting faces of the notches are slanted away from the ring ends. A positive interlock is thereby formed and, as above pointed, out, the material of the ring body has the strength preserved through uniformity of the material section below the notch over the linear extent of the notch base face or surface. The apparatus and system whereby this is accomplished is taught in the present invention.

While the present invention will be specifically described in preferred forms, obviously, minor variations can be incorporated but remaining within the scope of the invention.

SUMMARY OF THE INVENTION

Apparatus and a system for making locking split-rings for fluid sealing positionment intermediate to relatively movable parts. The fluid sealing ring has hook-shaped, interengagable notches in ends thereof. Preferably, the notches incorporate high accuracy in the formation of surfaces thereof and the angles at the points of intersection therebetween. In a preferred form, the hooks in locking ends of the sealing ring are inwardly slanted from the face to the top thereof at an acute angle to the axis of the ring and the so-configured hooks on opposite ends are in opposed faces of the ring body. In action, the slanted acute angle of interengagable hook faces so interengage that the ring will remain locked at all times prior to, and during, installation of the ring into a mating cylinder.

The notches, as so devised, coact, when engaged, to constitute a positively locked hook joint. In the hook formation, as formed, the base or bottom face thereof is of uniform section or thickness of ring material over the rectilinear length thereof, and thus serves to preserve, in a uniform manner, the ring strength.

The present invention is primarily directed to a method, apparatus and system for making such rings and, principally, the hook formations or cutouts in respective opposing surfaces of ring ends. The method utilizes a plunge cutting of the grooves by means of a unitary milling cutter having three cutting components operationally unitized. This plunge cutting in conjunction with the specific diameter of the cutters, and therefore, their peripheral faces, insure a substantially planar base face in the notch and uniform thickness of the material in the base of notch, and accuracy and sharp angles of intersection of all faces in the notch.

The invention can also be used for forming hooked notches having perpendicularly intersecting faces and terminal end, with the terminal ring ends, in the completed construction, having closely controlled tolerances, or spacings therebetween.

The method and apparatus for practicing the invention, additionally, and very significantly, can function to form the notch having upwardly directed faces slanted at a small angle from the ring axis and a terminal extremity parallel thereto. In this form of the invention, utilizing the plural component unitized milling cutter with a remote pivot mounting and a milling cutter size to simultaneously form the hooks and trim the ring ends, as required, in a minimum cyling time, serves to prevent disengagement of the hooks during an initial assembly thereof on a component and maintain end clearance variation within close tolerances. In this method, the outside diameter surfaces of the hook cutters are ground at the same angle relative to the cutter sides as is the angle formed by the notch faces with the ring axis, with a resultant uniform section in the face portion of the ring, following milling of the ring, for maintenance of section strength. It is also of significance in this latter-mentioned process that the angle of approach of the unitized cutters is the same as the resulting angle of slant of the upright faces of the notch and the ring terminal ends.

It is further contemplated by the invention that the rough-sized ring blanks can be, subsequent to feeding in a carrier mechanism, and appropriately end apertured and positioned therein, to be rectilinearly or rotationally moved from one to a succeeding operating station with the same plunge cut concept being utilized and with appropriate indexing means incorporated.

The end results of the two configurations permits use of the new concept of manufacture to form specifically different configurations, one of which is basically known, but having improved characteristics in the precise angular intersection of the faces and the overall notches or hooks adjacent the terminal ends of the ring being formed in a plunge cutting action with a substantial time saving, the exactness of face formation inherently increasing the interengaging, or hooking, action, and, in the second form, which incorporates the positive, angularly disposed hook engaging surfaces in the notch interior likewise being susceptible of forming in the same manner, with the same savings in time of manufacture and, as distinguished from the best known prior art, having increased strength characteristics in the overall end product.

It will accordingly be seen that sealing ring constructions can be so formed utilizing the present apparatus, and method concepts, as to not only save time of manufacture but, additionally, it gives improved or reduced angular end clearance tolerances between ring ends and, of substantial significance, preserves uniform ring strength characteristics in the area of the ring below the location of an angular type interlocking notch formed therein.

It is readily apparent, therefore, that the invention provides for ring constructions having closely controlled small end clearances in different hook formation designs, provides substantial time savings, and therefore cost of manufacture, and provides, in an angled hook configuration, a residual uniform cross-section below the hook portion of the notch in the body of ring.

The machine, as shown and described hereinafter, generally includes a ring blank loading station, two cutting stations for top and bottom hook cuts, a composite unloading-hooking station, a hooked ring catcher unit, and an index unit for transfer of parts under each station. A programmable controller functions to control the operating cycle. Preferably, a circular design is used, although a linear configuration is possible.

Further and additional differences and advantages will appear from the detailed description of embodiments thereof, both incorporating the same underlying principles and concept.

BRIEF DESCRIPTION OF THE DRAWINGS

FIG. 3 is a perspective view disclosing a sealing ring incorporating positive locking hook joint means in accordance with the invention;

FIG. 4 is a fragmentary perspective view, showing a hook joint ring in use with a hydraulic piston within a cylinder or casing;

FIG. 5 is a fragmentary plan view taken on line 5—5 of FIG. 3 showing hooks in ends of the ring;

FIG. 6 is a fragmentary side elevational view of the terminal ends of the piston ring as shown in FIG. 5, and taken on line 6—6 of FIG. 5;

FIG. 7 is a greatly enlarged fragmentary elevational view of the constructional details contained within the dot and dash circle of FIG. 6, designated FIG. 7;

FIG. 8 is a transverse section taken on line 8—8 of FIG. 6 showing an unaltered cross-section of the ring;

FIG. 9 is a view similar to FIG. 8 taken on line 9—9 of FIG. 6, showing details of a channel area constituting a portion of the hook end of the ring;

FIG. 10 is a transverse sectional view taken on line 10—10 of FIG. 6 showing an end elevational view of a hook end of the ring;

FIG. 11 is an enlarged fragmentary side elevational view showing the terminal ends of the hooked ring in an initial free but clasped position prior to association with an operating mechanism, the arrows depicting inherent resilient forces in the ring structure;

FIG. 12 is a view similar to FIG. 11 but disclosing the condition of the terminal ends with the ring under compression, such as shown in FIG. 4, and as evidenced by the end arrows;

FIG. 15 is a perspective view of a ring blank prior to utilization of the present machine, and prior to end notch cutting therein;

FIG. 16 is an enlarged fragmentary sectional view taken on line 16—16 of FIG. 14 showing the first cutting station for forming a hook configuration, or notch, in the upper surface of the ring blank, and trimming of the terminal end;

FIG. 17 is a plan view of a carrier plate for a ring to be cut, and showing a ring blank properly inserted into a non-circular shaped aperature of the carrier plate, and also disclosing, in dot and dash lines, the overlying position of cutting blades;

FIG. 18 is an enlarged fragmentary sectional view of a vertical or perpendicular configuration of a composite cutting blade including a plurality thereof unitized to a single member, taken on line 18—18 of FIG. 16, the blade being shown in a position for cutting a non-angular face hook, it being understood that the blade angle can be adjusted to form a desired hook angle such as, for example, 5°, as elsewhere shown in the drawings;

FIG. 19 is a plan view similar to FIG. 17, showing a carrier plate, the ring blank being inserted in the non-circular shaped aperture, and disclosing the upper hook and its associated trimmed end upon completion of the operation performed at Station 2, as diagramatically depicted in FIG. 13;

FIG. 20 is a greatly enlarged detail of the portion of the carrier plate and ring blank ends, encircled by the dot and dash circle designated FIG. 20 in FIG. 19;

FIG. 21 is a sectional view taken on line 21—21 of FIG. 20, and showing, in cross-section, the completed cutting operation performed at Station 2 upon the upper surface of the ring blank;

FIG. 22 is an enlarged sectional elevational view taken on line 22—22 of FIG. 14, similar in context to the showing of the second cutting station utilized to form the hook and trimmed end on the lower side of the ring blank;

FIG. 23 is a bottom plan view similar to FIG. 19, taken on line 23—23 of FIG. 22, showing the carrier plate and its associated ring blank positioned within a non-circular aperture, and having superimposed, in dot and dash lines, the cutting position of the lower cutting and trimming blade assembly;

FIG. 24 is a fragmentary plan view similar to FIG. 19, it being understood that FIG. 24 is a plan view opposite to the showing of FIG. 19;

FIG. 25 is a view similar to FIG. 20 and showing, in greatly enlarged detail, those details contained within the dot and dash circle designated FIG. 25 on FIG. 24;

FIG. 26 is a sectional view taken on line 26—26 of FIG. 25, showing in cross-section the ring blank having hook and trimmed end portions accomplished at Station 2 and 3, respectively;

FIG. 27A is a fragmentary elevational view of a rough formed ring as placed in a carrier plate, not shown, with the ring gap in a compressed, predetermined position for subsequent formation of a ring of a particular size, the cut in this configuration being vertically disposed;

FIG. 27B is a view similar to FIG. 27A and disclosing a unitized, multi-milling cutter, fragmentarily, in an angle of approach to a ring end for a vertical left side hook and length cutting operation, the depiction here covering the different cutting stages or steps in the upper cutting operation;

FIG. 27C is a view similar to FIG. 27B but in a subsequent point of operation disclosing a downward plunge cutting stroke to form a notch;

FIG. 27D is a view disclosing a subsequent phase or step in the method wherein the hook and terminal end on the upper face of a ring end has been completed and a second hook and length cutting operation has been initiated, as shown in broken lines, to form the bottom face hook of a mating terminal end in the ring;

FIG. 28A is a view similar to FIG. 27A and disclosing the initial step in formation of a specifically different hook design, as illustrated in subsequent FIGS. 28B–28E respectively;

FIG. 28B is a view similar to FIG. 28A and disclosing a unitized, multi-milling cutter, fragmentarily, in an angle of approach α to a ring end for a left side hook and length cutting operation, the depiction here covering, in effect, the first three blocks of FIG. 13;

FIG. 28C is a view similar to FIG. 28B but in a subsequent point of operation disclosing a downward plunge cutting stroke to form a notch and corresponding to the third of the blocks in the sequence;

FIG. 28D is a view disclosing a subsequent phase or step in the method wherein the hook and terminal end on the upper face of a ring end has been completed and a second hook and length cutting position on the opposed ring end has been initiated on the bottom thereof;

FIG. 28E is a view similar to FIG. 28C and wherein the right end of the ring has been notched from the bottom surface and the terminal end has been cut;

FIG. 28F corresponds to the last block of FIG. 13, wherein the matable opposed hooks and end length cutting has been completed; and FIG. 28G shows a hook coupling and ejection step of the invention, wherein the coupled end ring is disposed for ejection to a discharge chute.

DESCRIPTION OF THE PREFERRED EMBODIMENT

Figure 2:
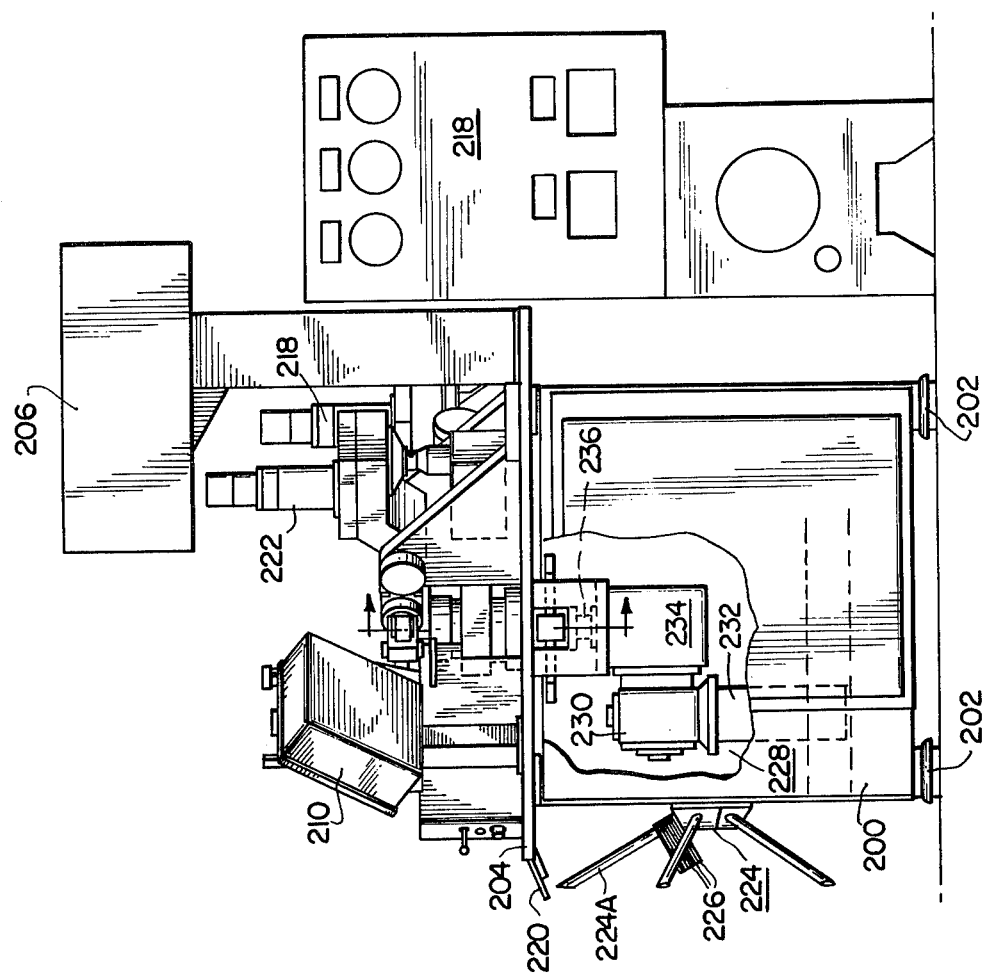
FIG. 2 is a side elevational view of the machine of FIG. 1.
Figure 1:
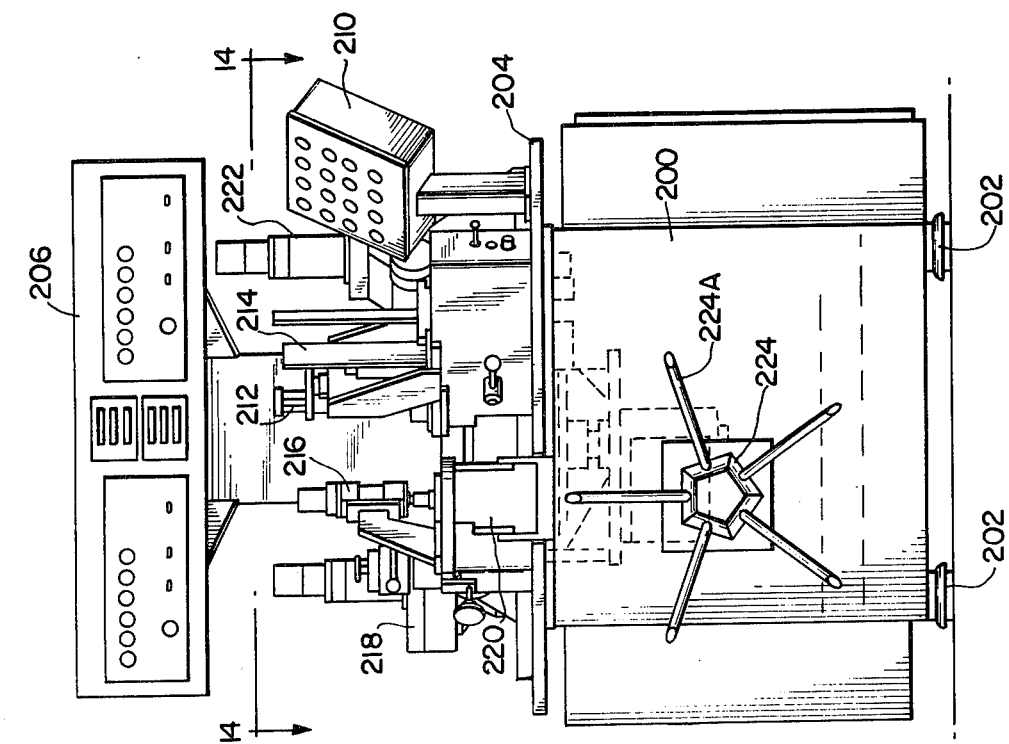
FIG. 1 is a front elevational view of the machine of the invention.

Referring now, generally, to FIGS. 1 and 2 of the drawings, there is disclosed external views of the hook joint machine and its general association with various components thereon. The machine, generally, includes a base member, generally designated 200, having at its base leveling mounts 202. A table top 204 is mounted above the base. Disposed above the table top, and in usable association with the machine, there is mounted, generally, an electronics stand or console 206; a hydraulic power pack 208; a push button control panel mounted on a pedestal and generally designated 210. A loading and positioning assembly for ring blanks is shown mounted above the table top at 212; a sized hopper for ring blanks, designated 214, is positioned adjacent the loading member 212. An ejection unloading and coupling mechanism is mounted at 216. A lower ring cutting assembly is operatively positioned at 218. A completed ring discharge chute for finished, coupled rings is operatively located at 220. An upper cutting assembly is mounted at 222, operative, as hereinafter described, to make a first cut in an upper side of the ring. Mounted on base member 200, and positioned below discharge chute 220, is an indexable collecting rod mechanism 224, operable for receiving finished and coupled hook rings. A plurality of so-collected and completed rings is shown at 226 on arm 224A.

While details of the various components and mechanisms is not described with respect to these general views shown for purposes of an overall understanding and setting of the machine, it is to be noted in FIG. 2 that a section of the base 200 has been broken away at 228 to disclose drive and alignment mechanism for a ring carrier plate. This mechanism includes a drive motor 230, mounted on supporting column 232. An indexer transmission 234 is operatively connected to motor 230, as shown. An output shaft 236 is connected to the indexer 234, and engages and operates a plate carrier.

To facilitate an understanding of the article to be produced by the apparatus and system, and the method of accomplishing the same, reference is now made to FIGS. 3–12, inclusive, for the ring and to FIGS. 27A–27B for a vertical notched ring method of manufacture and to FIGS. 28A–28G inclusive, for the method as directed to a notch having an angular disposition with respect to the longitudinal axis of the ring. A detailed discussion of these figures, and the disclosures therein, follows.

In order to fully understand the purpose and function of the method, a ring which is manufactured in accordance with the present method is shown in FIGS. 3–12, inclusive, with one usable setting being shown in FIG. 4 of the drawings.

Referring initially to FIGS. 3 and 4, there is shown generally at 20 a sealing ring in accordance with the teachings of the invention, and this ring 20 is shown in an operative installed position on a piston 22 mounted for sliding operational containment in a cylinder 24. A portion of the cylinder 24 has been broken away, and shown in section at 26, to facilitate more clearly an understanding of a setting or use of the invention. The piston 22 has also been broken away and shown in section in the area designated 28. The sealing or piston ring 20 is shown in FIG. 4 operatively disposed or mounted in a usual groove 30 in the piston. In functional operation, the piston will oscillate within the inner wall 32 of the cylinder. In the condition shown in FIG. 4, a liquid seal is formed between the outer periphery or peripheral surface 34 of ring 20, the fact 34 being in slidable contacting engagement with inner wall 32 of the cylinder in a known manner. It will be obvious that the ring of the invention can be used in different settings, and in conjunction with different specific forms of mechanisms, such as in transmissions or the like. The main aspects of the invention, however, will be apparent from the single disclosed operational embodiment thereof.

The ring 20, as usual, further includes an inner face 36 and upper and lower axial faces 38 and 40 respectively. The ring terminates in first and second ends, generally respectively designated 42 and 44. As well known, the construction of such sealing or piston rings incorporate inherently a resiliency so that the ring in an unmounted or inoperative condition as shown in FIG. 3 has the ends 42, 44 spaced from one another. In a mounted or operative position as shown in FIG. 4, these ends are interengaged in a usual construction, and in the type of ring of the present invention, the ends are interengaged by means of hooks formed in the ring material and designated 46 and 48.

The hooks 46, 48 are formed in the ring material in the form or configuration of notches, which are cut or milled in a particular manner, and utilizing a particular form and configuration of cutter which forms a significant part of the present invention, and will be specifically discussed and described hereinafter. Broadly speaking, the mechanism for cutting of the notches 50 and 52 consists of a unitized gang of rotatable milling cutters which are integrated to constitute a single entity. The unitized milling cutter will include specifically three members or units, of which two are adapted respectively to form a first or main notch segment 54, with the second cutter serving to cut off or remove an upper portion of the ring body to form an outer reduced height or truncated end portion or member 56. The third cutter serves the purpose of precisely and controllably cutting off and forming the terminal end of the ring, indicated at 58, referring to end 42.

It is to be noted that the notches formed in the respective ends 42, 44 are in opposed or opposite sides of the ring body. This is clearly shown in the figures of the drawing. In this connection particular attention is invited to FIG. 6 of the drawings, wherein the ring is in an unassembled or unmounted condition and, as shown, the respective notches 50, 52 are formed in opposite axial faces of the ring and are disposed or open in opposite directions. This arrangement permits the interengagement of the ends of the ring to a locked interconnected condition for mounting in a mechanism as shown in FIG. 4. This condition of interengagement will be further discussed with respect to FIGS. 11 and 12, FIG. 11 showing the ring in a "free hooked" condition and FIG. 12 showing it assembled in a cylinder as in FIG. 4.

Referring to FIGS. 6 and 7, there is shown a generally L-shaped or partly truncated U-shaped configuration, which constitutes one hook end, namely end 42, as contemplated by the invention. As shown, there is a hook formed by a notch and having at its extremity or terminal end 58 a generally upstanding portion or leg having a height designated Y, whose inner upwardly directed face forms an angle of between about 5° and 10° with the vertical, the angle being indicated at $\alpha$.

This leg also has a horizontally extending top portion $X_1$, which terminates in a downwardly angularly inclined face 60, having a height of $Y_1$. The overall height of this end member 56 is designated Y and includes $Y_1$ and $Y_2$. Extending from the lower and inner righthand edge of face 60, at distance $Y_1$ from the upper surface, there is a horizontally extending notch base surface or face 62 having a length designated X, and which, as shown, is substantially parallel to the external bottom surface 40 of the ring. This portion is of thickness $Y_2$. It is especially noted that all of the generally upstanding faces or surfaces are disposed at the angle $\alpha$ from the vertical. This angle has been found to constitute an optimum practical and operational limit or amount. The surface 62 also terminates in a generally upstanding inner wall portion or face 64 disposed at an angle $\alpha$ to the vertical, and extends to the upper surface 38 of the ring 20. In addition, the geometry of the hook, from the first edge on the upper surface of the ring to the very terminal edge of the hook extends a distance L.

Basically, the hook of a generally L-shaped or truncated U-shaped configuration has a total vertical height H, a horizontal extremity of length L, and a uniform thickness at X of $Y_2$. The lowermost surface 62 terminates in the generally upstanding leg portion 56. The overall hook segment has the length L, and leg 56 a thickness of $X_1$. Repeating, it is to be noted that all the generally vertical or upward planes or faces are inclined at an angle $\alpha$ with respect to the vertical, and all the horizontally extending surfaces are parallel, and at 90° with respect to a vertical. Another way of stating this is that these latter surfaces are all horizontal, with respect to the vertical, the horizontal being constituted by the side or lateral faces of the ring.

As mentioned above, only a single end and the notch or hook therein has been described in detail, the opposite end of the ring will have the notch 52 formed in a reverse manner from notch 50 and with the same conceptual formation and geometry.

The particular configuration and dimensions of the notch and terminal end components which all conjointly constitute the hooking notch are features of the invention.

For a better understanding of parameters of possible dimensions, the dimensions of a single ring construction is set forth hereinafter, but is not to be considered in any way a limitation of individual dimensions, which can vary within ranges depending upon the overall ring size and its use. The same applies to the designated angle, which can be varied while retaining the concept of the invention. Reference is here made to FIGS. 7, 8, 11 and 12, wherein possible dimensions for the aforedescribed embodiment are indicated. The recited dimensions are to be considered as approximate, and will serve to give comparative values or dimensions in a single embodiment, and which are subject to variation as will be appreciated by those skilled in the art. The dimensions are for a ring having an O.D. of approximately 3"; the radial thickness of the ring is 0.130"; the axial width 0.093"; the length X is 0.060"; the width of the leg at $X_1$ is 0.025"; the depth of the material remaining between face 62 of the notch and the outer surface 40 of the ring is 0.0337". As mentioned above, FIG. 11 discloses the ring of the invention in a free hooked disposition attained by interengagement of the hooks on the two respective ends, and prior to installation as disclosed in FIG. 4. The distances between opposing face surfaces in this condition, as shown in FIG. 11, as designated at $S_1$ and $S_2$, are 0.030". In the operative mounted condition shown in FIG. 4, these dimensions become $S_3$ and $S_4$=0.007". These dimensions are approximate and can vary within ranges such as, for example: $S_1$ and $S_2$, generally 0.030–0.050". In the condition shown in FIG. 12, the dimensions $S_3$ and $S_4$ could, for example, vary between 0.002–0.007". The type of cutters utilized to form the hooks and trim the ring ends, within a desired minimum cycling time, help to maintain end clearance variation within, for example, a 0.002–0.007" specification.

The foregoing description has been particular to method and apparatus, wherein the various operating stations are functional in conjunction with a rotating plate type of machine.

With the ring confined in a horizontal plate, the cutters are advanced at an angle from the ring axis, to address the top or bottom sides. The outside diameter surface of the hook cutters are also ground, in one form of the method, at an angle of between 5° and 10° relative to the cutter sides, to provide a uniform section in the remaining portion of the ring below the base notch face for maintenance of sufficient section strength. While the process shows a restriction to a particular angular range, however, it is not to be considered as finally restrictive, although it is felt that this is an optimum specification. In the vertical form of the notch this angle, of course, is not utilized. It is also of significance to note here that a plunge cutting operation of different cutters parallel to the ring sides in a horizontal plane, or a plurality of angularized, individual cutters sequentially operated to obtain somewhat a similar end result, comprehensive but not seen wherein such is possible. The bottom surfaces of the notches are substantially planar or slightly arcuate, and the terminal ends are likewise at the appropriate angle when using plunge cutting due to the peripheral or diametrical size of the individual cutters, and a far removed pivot point of the unitized cutter.

While the preceding figures directed to one form of specific embodiment have reference characters thereon and correlated with the detailed description, it is considered advisable to use an additional or new set of reference characters to avoid confusion.

Referring now to FIGS. 28A–28G inclusive, there is shown in FIG. 28A, fragmentarily, a portion of a ring blank 70, which is positioned in an opening in a carrier plate and which is confined has a definite size ring gap 72 formed between its terminal ends. The ring blank prior to being compressed has a free gap opening and peripheral length that results in a predetermined gap 72 when positioned in a carrier plate. This predetermined gap must be set in the carrier opening prior to the cutting operation and the gap must be precisely stationed by positioning means so that, in a subsequent terminal end cutting step, some amount will be removed from each terminal end of the ring, and provide for uniformity of notching of the ring ends.

FIG. 28B discloses a configuration of cutters, generally designated 73, which are introduced or moved toward the first hook to be cut in the upper surface of one ring end. It is to be noted that the advance of the cutter, in the direction of arrow 74, is at an angle $\alpha$ to a vertical line 76, spaced from a vertical center line 78 for reasons hereinafter to be set forth. The angle is shown between lines 76 and 80 in spaced relation to line 78 in order to perform a terminal end, 82, cutting. It is here to be noted that the cutter, generally indicated at 73, consists of three members unitized or combined into a single entity on a common mounting shaft (not shown) for advancement into a cutting position and rotation. Cutter 84, cutter 86 and cutter 88 are moved toward the upper surface 90 of a ring end, to cut into the ring blank material and form an inner notch portion 92, cutter 86 serves to define an upstanding or truncated terminal end portion 94 and cutter 88 services to cut the rough blank material at an appropriate angle and position to form the terminal end 96. Again, it is emphasized that the various cutter elements 84, 86, and 88 are unitized as an entity and so mounted as to be given or capable of a plunge cutting action rather than a transverse or lateral motion toward and through the ring blank from a peripheral surface thereof. Here, the cutting action takes place along and into the top surface 90 of the blank. The first end hook and length cutting takes place, as indicated in FIGS. 28A–28C and the designations to the left of these figures delineates the type of action or method step taken.

FIGS. 28D–28F show a counterpart of the previous figures wherein bottom surface 98 is approached by a gang cutter, designated 100. The individual cutters have been designated 84A, 86A and 88A for a better understanding and, following the cutting action, which is shown in FIG. 28E, the notch and end portions 92A, 94A and 96A correspond with similarly designated areas in the preceding figures. The lower cutter 100 is identical with the upper cutter 73, but is inverted and approaches the opposite end ring from below. The diagonal angle remains the same, i.e. α, and as particularly shown in detail in FIG. 7 of the drawings.

FIG. 28G shows the ring blank having the two opposite ends thereof with formed hooks having the same but oppositely disposed angles and portions for the interengagement or interhooking, as referred to in connection with FIGS. 11 and 12, and also as shown in FIG. 4 in operative condition. FIG. 28G shows a hook coupling and ejection step to a discharge chute, as later described, the ends having been overlapped and closed by an angular relative disposition.

In the form of the invention shown in FIGS. 28A–28G, inclusive, the notches forming the hook ends might be considered as forming a biased hook design. Additionally, and of significance, it will be noted that the lower cutting surfaces of cutters 84 and 84A are disposed at an angle α(5°, preferably) and this insures that the bottom or lower surface 104 of notch 92 is horizontal and the depth is constant throughout the linear length thereof. This results in uniform strength of this area of the hooked end as clearly distinguished from the showing in the British patent above referred to.

It is also again pointed out that the dimensions and positionment of the cutters 88 are such that the terminal ends 96, 96A are at the proper angle and an appropriate spacing is insured for the purposes set forth above in connection with FIGS. 6, 10 and 11.

It is pointed out, and strongly urged, that the uniformity of cross-section between the hook and body portion, and controlled end clearance between the outer hook face and the wall of the bottom of the ring has not been possible in a single cutting movement, nor by a traversing method of cutting as distinguished from the plunge cutting of the present invention.

FIGS. 27A–27D are similar to FIGS. 28A–28D hereinabove described in detail. In this form of the invention, however, the blank 106 is approached by the gang cutters 108 at a vertical angle to the axis of the ring and the individual notch faces are disposed at precise right angles to one another. A similar plunge cut is used in this form of the invention and, again, the three individual milling cutters are unitized. While a traversing method could be used, the plunge type cutting action is much more rapid and a greater degree of accuracy is possible. Out of round intersections between faces in the notches and improper spacings between ring ends is avoided by the single cutting operation rather than a plurality of transverse cutting operations, perhaps utilizing a plurality of separate, individual cutters.

The same uniformity of strength is provided on the bottom of the notch in this form of the invention, and the surfaces are so accurately defined that a dislodgement of the interengaged hooks is difficult. In other words, the present invention again provides substantial improvements over known art. Especially when the acute angle is provided in the locking ends, in conjunction with the intrinsic expansive tension of the ring, a very substantial force against inadvertent separation in the axial direction occurs. Sometimes, during the transfer of a sub-assembly that contains a ring in the groove of a shaft, a condition occurs where the locked ends become unconfined by the groove due to allowable radial displacement of the ring relative to the shaft outside diameter. Inherent helix configuration of the ring, vibration imposed during transfer of the sub-assembly, and mishandling are all factors that can cause disengagement of the locking ends of conventional designs, but certainly have no effect on the slanted hook design, nor the precisely milled vertical form of the invention.

In a particular cutter configuration and apparatus used for cutting, for example, a ring having an outside diameter of 3.000" the cutting disc diameter is 4.5" and the cutting edges are pivotally mounted approximately 45" from the position of the cuts so as to create a substantial planar base cut.

While in the foregoing general description of the machine or apparatus of the invention, as shown in FIGS. 1 and 2, and the specific disclosures of the final rings shown in FIGS. 27A–D and 28A–G, in effect disclosing the method used in the invention, we will now proceed to detail features of the particular machine, apparatus and system for accomplishing the present invention. Reference is made to the following figures of the drawings. In several of these figures, there are included specifics of details which are self-explanatory and understandable to those skilled in the art. A detailed discussion of these minute details is not considered necessary.

The present machine has been designed for compactness, and to this end a plurality of working stations are positioned circularly on a machine to compact the overall machine dimensions, and provide availability for operation control and repair.

Figure 13:
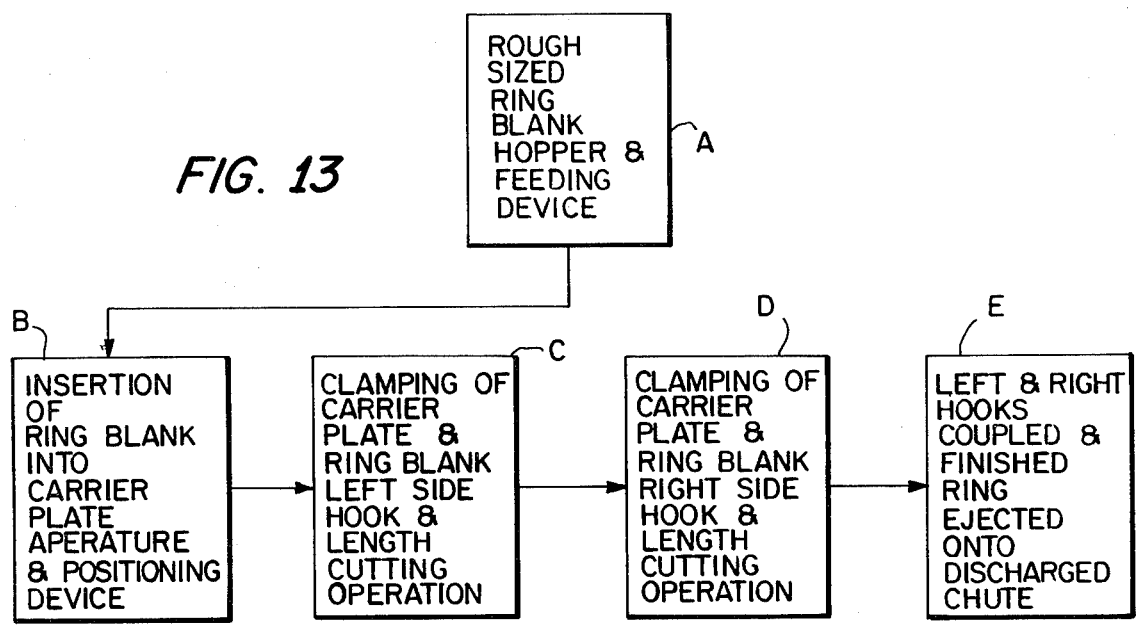
FIG. 13 is a block diagram disclosing the sequential steps utilized in accomplishing the present invention.
Figure 14:
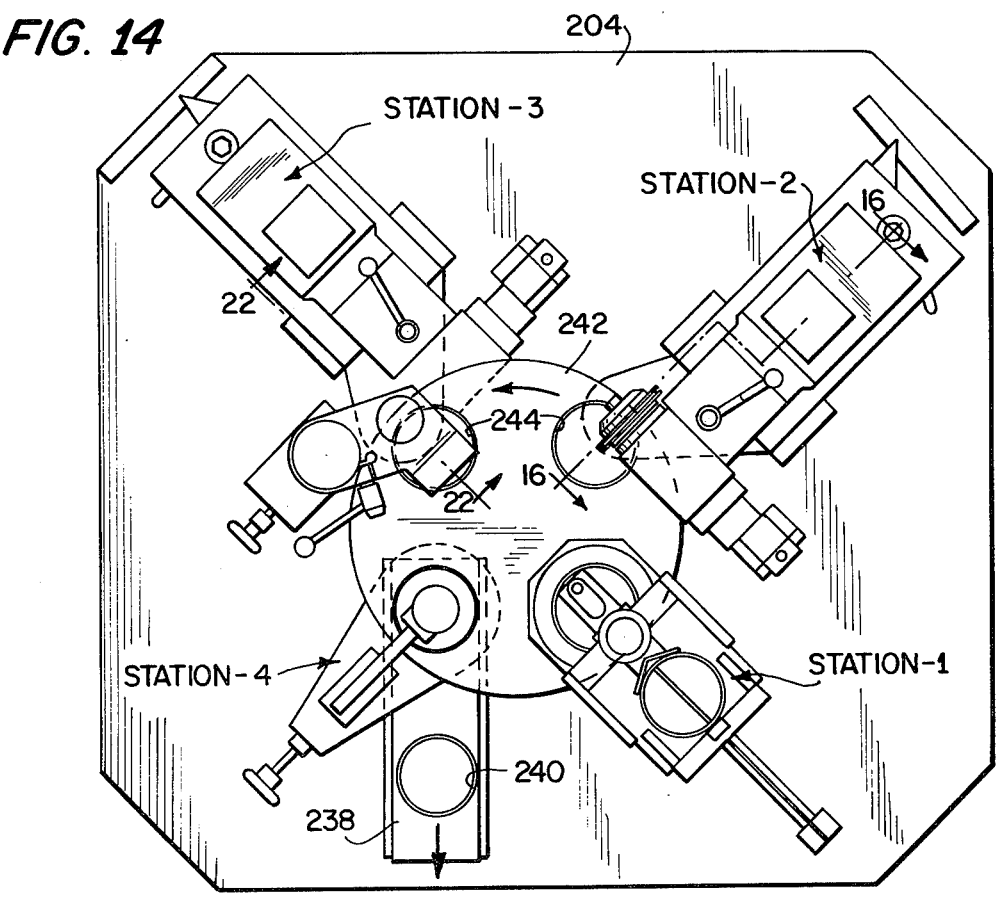
FIG. 14 is a plan, sectional view, taken on line 14—14 of FIG. 1 showing the machine generally, as also the plurality of different operating stations of the machine.

Reference is now made to FIGS. 13 and 14 of the drawings, as relates to the overall construction of the machine. The end result of the machine is to provide finalized rings having hooks in opposite terminal ends thereof which are interengaged in a free hooked end condition, ejected from the machine, and collected in a stack shown at 226 in FIG. 2.

Referring again to page one of the drawings, FIG. 14 is a plan view taken on line 14—14 of FIG. 1. This plan view discloses the upper deck and stations that are involved in the present process. Looking down on the upper deck, which is the table referred to at 204 in FIG. 1, there are disclosed, schematically, a plurality of operating stations through which the rings pass from an original rough blank to the finalized notched and hooked ring. Station 1 is positioned in, approximately, a five o'clock position with respect to the table 204. This first station includes a ring blank hopper for rough sized rings and feeder device therefor. The table has the various stations disposed sequentially in a counterclockwise manner as will be described in greater detail hereinafter. In a counterclockwise direction, Station 2 is mounted. Station 2 constitutes a first, or upper, ring blank cutting station. Continuing in a counterclockwise direction from Station 2, Station 3 is mounted. Station 3 provides for a second, or underneath lower cut, on a second terminal end, and on the side opposite the first cut end. Station 2 and 3 also include, in addition to the cutting device, a clamping device. Again continuing in a counterclockwise direction, Station 4 constitutes a finalized ring ejection and coupling station. Positioned directly under Station 4, referring to FIG. 14, there is a rectangularly shaped discharge chute 238. A thin, completed ring is indicated at 240 as sliding down the angularly disposed chute. This is a completely double end notched and sized and free coupled ring which slides down the discharge chute, and is then collected on one of the fingers 224A into the stack 226, as shown in FIG. 2. The collecting member 224 is a manually operated device, and includes a plurality of arms or prongs such as at 224A. As the coupled rings slide down the discharge chute 238, sliding off the edge thereof, they are grasped by one of these five prongs 224A.

The foregoing steps, referring to those broadly indicated at the four stations, correspond to the steps designated in the diagrammatic viewing of FIG. 13. FIG. 13 includes a plurality of blocks corresponding to the steps designated in the diagrammatic viewing of FIG. 13. FIG. 13 includes a plurality of blocks corresponding to the various stations of FIG. 14. The first upper block A and block B are both operationally or functionally included in Station 1. As designated in block A, a rough sized ring blank hopper and feeding device are incorporated in Station 1, and block B designates the insertion of the ring blank into a carrier plate aperture and positioning device, for subsequent carrying around the ring to be worked on in the different operating stations. Blocks A and B are, reiterating, both at Station 1.

Block C is at Station 2 and, as designated, includes means for clamping of the carrier plate and a ring blank for a left side hook and length cutting operation. This is an upper cut.

Block D corresponds with Station 3. At this station, the ring blank is clamped to the carrier and a second hook and length cutting operation is effected on the right side of the ring, but in the opposite or underside thereof.

Block E corresponds with Station 4. At this station, as designated, the left and right hooks which have been formed are automatically coupled, in a free hooked end condition, and the finished ring is ejected into the discharge chute 238.

Again referring to FIG. 14, the upper deck or table 204 has operatively mounted thereabove a turntable carrier place 242, which has a plurality of ring carrier holes or openings 244 therein. These holes are generally non-circular in configuration. A plurality, four in number shown in FIG. 14, are incorporated in the carrier plate. It is possible to have a larger number of these holes, depending upon the size and number of the ring blanks to be cut and the size of the machine. Precise indexing of the rotational place position is included for positive positionment thereof at the individual stations. In other words, a varied number of ring blanks could be operation on in a similar machine.

The ring carrier openings or holes 244 in the turntable carrier plate 242, and which have been defined as generally non-circular in shape, constitute a very significant part of the present invention. These ring carrier openings must be precise in size and configuration. They serve a complex function in operation of the machine. A first function is that they serve to bend or distort a rough ring blank inserted therein such that the ends of the blank are disposed and positioned so that when the notches are cut, the faces of the notch and the terminal ring ends will be generally parallel with each other when in the operating. position (See FIG. 4) to thereby maintain uniform end clearances.

In the absence of such distortion or bending, the precise positioning and aligning of the various vertical faces in the notches and the ring ends would not be generally or substantially parallel and would detract from the overall desired end result. A second feature of the shape, in combination with the size thereof, is that it will serve to lock the rough ring blank in the carrier plate due to its non-circular shape. This insures that the ring to be worked on is always properly positioned as it moves through the various operating stations. This carefully designated aperture provides a predetermined gap between the terminal ends of the ring blank.

As mentioned, the function of this indexing mechanism, when considered overall, is to insure that the carrier plate 242 and the rings to be cut mounted thereon will be precisely positioned in the various operating stations 1–4, inclusive, so that the functions defined in blocks A–E can be appropriately effected.

Referring now to FIG. 17, there is shown, in perspective, a rough ring blank 300. This rough ring blank is quite closely governed in dimensions as furnished to be treated in this machine, and the free gap 302 must be within specified limits. The notching or cutting of this gap and the sizing occurs prior to the delivery of the blanks to the operator. These blanks are provided in stacks. The machine operator will take a stack portion of the rings of FIG. 17 and slide them, vertically, down, in a hopper.

Proceeding now to FIG. 16, this is an enlarged, fragmentary sectional view taken on line 16—16 of FIG. 14. This shows the first cutting station for forming a hook configuration, or notch, in the upper surface of the ring blank, and trimming of the terminal end. As shown in FIG. 16, the cutting blades, indicated at 336 in broken lines, are unitized into a single entity, as shown in FIG. 18. The unitized blades, three in number, can be considered as ganged. In operation, the ganged blades will operate as shown in FIGS. 27 and 28 upon movement, downwardly, into cutting engagement with a ring blank 300. The larger diameter cutting wheel, shown in FIG. 18, constitutes an end trimmer, the wheel at the intermediate serves to terminate the upstanding end of the notch, and the opposite end wheel cuts the notch, per se, and forms the planar lower surface thereof. Depending upon the arrangement and function of these ganged cutting wheels, an angular or vertical disposition of the edges of the notches and ends of the blank will be determined.

To effect the cutting, the mechanism shown in FIG. 16 is used. This includes, as shown, a main arm 338, pivotally mounted at 340. A ball screw and nut assembly, generally designated 342, is operable to pivot the arm 338 during the pre-set cycle. The precise downward and upward movement of the cutting blades, or wheels, as indicated by arrow 344, can be extremely, carefully, and precisely controlled by means of operation of a stepping motor 346, shown at the upper right-hand corner of the ball screw and nut assembly in FIG. 16. A stepping motor known in the art is usable. Functionally, the stepping motor can be imparted a predetermined number of counts, so called, in the nature of electrical pulses, which will rotate the motor a predetermined number of degrees, and this, in turn, through the output spur gear 348, will drive a large gear 350 in the ball screw and nut assembly. This is operable, with the mechanism shown in FIG. 16, to pivot the arm 338 about the pivot point 340. Means are included to prevent the rotation of the ball screw, and yet allow for vertical travel of the ball nut, associated spur gear, cover plate and pivot arm member. The overall unit is mounted in block 352, with a thrust bearing supporting means 354, for the lower terminal end of the jack screw means 354.

The cutter blades are mounted on a bearing block 356, having a male dovetail 358 thereon, in cooperation with a female dovetail groove 360. A clamping means, shown at 362, is generally operable to relatively position the two dovetail-shaped members and, therefore, the longitudinal position of the bearing block carrying or mounting the cutting wheels thereon. A drive motor is provided to rotate the cutting blades. The amount of oscillation is shown at 364. Direction of rotation of the cutting blades is indicated by arrow 366.

The dovetail coacting members are usable to obtain perfect alignment of the ganged cutting wheels 336 with the center of the ring shown in the restricted and bent condition in a carrier plate opening of non-circular shape 244, as shown. It will here be noted, in FIG. 17, that the blades 336 are effecting the upper cut and, due to the non-circular configuration, will adequately, radially align the end edge and notch faces.

In order to insure that the ring does not turn, and is properly cut, clamping means, generally designated 370 in FIG. 16, are used and include a presser foot 372, operatively engagable with the ring and carrier plate 242. The non-cutting position is shown in full lines at 374, with the cut depth indicated by broken lines at 376. This is very precisely controlled through the stepping motor and the controls therefor, which function in extremely small increments. Of course, the depth of cut will be governed according to the size of the ring to be cut, and the axial width thereof, as readily understandable. The mounting and guide means for the clamp mechanism 370 are also shown in the lower right-hand corner of FIG. 16. A detailed discussion of the jack and ball screw mechanism is not considered necessary, since it is well known in the art.

It is well to note here that for each moving increment imparted to the stepping motor, there is a movement in the neighborhood of approximately two thousandths of an inch adjustment and, therefore, dependent upon the number of pulses, the depth of movement of the cutting blades is controlled to compensate for the axial width of the blank ring to be cut.

Attention is again invited to the pivot arm of FIG. 16. Underlying the pivot arm 338 is a small boss 378, attached slightly to the right of center, and containing a small roller 380. This is engagable with a sensing head 382 of a solenoid-operated device. As the pivot arm moves up or down, and the cutter wheels move up or down therewith, this sensing head senses the motion during all intervals of time and establishes the limits of the cut, as set in the circuit. This is all dependent upon the precise programming of the machine, which controls initiation, operation of the cutting wheels, motor cut-off, reverse movement, or a steady holding at a certain grinding point or retracted point. This sensing device can serve as a limit switch, being pre-set to specified limits and, thereby, constituting a go-no go type of operation, to control limits of up and down, and horizontal movement.

As will be noted in FIG. 16, the upper cut is being performed and, preferably, a carrier back-up plate 384 is utilized in conjunction with the plate 242 and the clamping means 370. The clamp, per se, is in the nature of a C-type clamp. Looking now at FIG. 19, this shows a plan view similar to FIG. 17, showing a carrier plate, a ring blank being inserted or contained in the non-circular shaped aperture, and disclosing the upper hook and its associated trimmed end upon completion of the operation performed at Station 2, as diagramatically depicted in FIG. 19. In this view, or position, a notching operation and sizing cut is being effected. Details of this are shown in FIGS. 20 and 21. In FIG. 20, the notch is indicated at 386, as also in FIG. 20. This is a vertical type of cut, and the non-circular concept can be seen where indicated, generally, at 388. It is due to this arrangement, as mentioned many times hereinbefore, that the faces of the notch and the terminal end are substantially parallel.

FIG. 22 is an enlarged sectional, elevational view on line 22—22 of FIG. 14, similar in context to the showing of the second cutting station utilized to form the hook and trimmed end on the lower side of the ring blank. The structure and cutting action of the mechanism shown in FIG. 22 corresponds to the operation taking place at Station 3, which is opposite to that shown in FIG. 16, and constitutes the second cutting station. The same type of clamping and control means are here used. The cut, however, is now being effected in the underside of the heretofore unaffected end of the ring blank, as is obvious.

FIG. 23 is a bottom plan view similar to FIG. 19 taken on line 23—23 of FIG. 22. This shows a carrier plate 242 and the position of a cutter wheel 336, approaching from the bottom and disclosing, referring to the center of aperture 244, how the cutter blades overlie the ring on the underside before cutting.

FIG. 24 is a fragmentary plan view similar to FIG. 19. FIG. 24, however, is a plan view opposite to the direction of the showing of FIG. 19. FIG. 25 corresponds to the showing of FIG. 20, and shows the area corresponding to the circle designated FIG. 25 in FIG. 24. FIG. 24 shows the ring after it has been cut on both sides; i.e., the cutting or notching has now been completed, the last step having been effected in Station 3 (corresponded to the action in block 4). In FIG. 26, there is shown in cross-section the ring blank having the hook and trimmed end portions accomplished at both Stations 2 and 3. The opposite terminal end has now been cut and the notch formed, as designated at 386A. The two notched ends are shown in FIG. 24.

Structurally speaking, the ejection and coupling mechanism in Station 4 is simple in that it includes a ram body, a pusher plate or head, carrier on the lower end of the ram and a transition sleeve or device through which the ring is passed after being pushed out of the carrier plate 242. As the ring passes through the transition sleeve, the ends are offset slightly to permit the hooks to overlap.

The ring has two memories which are operable, at this time, to bring the hook ends into a free hooked position with respect to one another and, at the same time, a planar position of the ring is assumed. The ends are, accordingly, interengaged and hooked and further movement of the pusher head discharges the so-completed and ejected ring 240 into an area, below the ejector mechanism.

At this point of operation, the completed ring will drop down onto the discharge chute and, from thence, onto one of the collector arms, as shown in FIGS. 1 or 2. The operation at this point is substantially complete.

It is again pointed out that certain dimensions and settings will vary, depending upon the size of the rings to be treated, including thickness, number to be carried by the plate, diameter, etc.

It is here again mentioned that the length of the pivoted arm carrying the cutter blades, in conjunction with the diameters of the cutting blades, are such that, when the blades are moved into the cutting position, they will perform the cutting in the manner required for the inner, lower, substantially planar base face and the arrangement is such that the other vertical faces will be either angular, as previously discussed, or substantially vertical, depending upon the particular arrangement and mounting of the arm and cutting blades thereon.

The specific details and components of the electrical, pneumatic and hydraulic systems and circuits have not been herein discussed since not required for an understanding of the invention, and within the scope of those skilled in the art. Generally speaking, the individual components utilized for driving and control of the different components are commercially available items, which can be obtained in the open market and appropriately installed by skilled workers in the art. The controller is a micro processor-based sequencing system, which is housed in its own enclosure, and appropriately installed on the machine. The operating program is stored on electric memory circuits within the controller. All printed circuit cards are standard items available from the manufacturer of the apparatus. The specialized memory elements are plug-in integrated circuits which plug into these standard circuit cards. Obviously, duplicate memory "chips" can be provided with the machine with a master, or extra, set stored by manufacturer.

Trouble shooting of the control system is very similar to that of conventional control systems, and is in many ways simpler, since status indicators are provided for all external inputs and outputs.

The machine incorporates a plurality of safety controls, not shown, which can include proximity probes and visual displays therefor, as also digital counters used for control of motion of the machine. The particular items and their installation and adjustment in the machine are not felt to be a part of the apparatus or machine, per se, being within the skill of the operator. Controls for the stepping motors for the upper and lower cuts can be incorporated on the electronics stand or console 206 in FIG. 1, and various digital readouts for upper and lower cutter head movements can also be utilized thereon. There have not been specifically described.

Recapitulating and condensing the foregoing disclosure, the present invention is directed to apparatus or a machine for making positive locking sealing rings, which includes a rough sized ring blank hopper adapted for containment of a plurality of ring blanks. A feed device is operable to separately and sequentially feed the ring blanks into the machine for cutting notches in opposed end terminal faces for subsequent interengagement for maintaining a ring in a free-hooked condition. A ring carrier plate having a plurality of blank receiving apertures thereon is mounted for movement into and through a plurality of operating stations of the machine. The apertures of the carrier plate are preferably non-circular in configuration, and serve to compress, deform, and restrict ring blanks in a particular condition therein. The apparatus further includes means to clamp the ring blanks in the carrier place apertures, to prevent movement during cutting operations. Multiple unitized cutting means are rotatably mounted and are controllably operable, in a single plunging motion, to initially cut and trim left side ends of the ring blanks to an angled face, and to cut hook-shaped notches into the ring blank materials. Means are included to subsequently cut the right side ends of the ring blanks in the same manner, but from the opposite side of the ring and in a generally reversed position from the first cut end and notch. The apparatus further includes means to interengage and couple the opposed, angled notches to lock the ring into a first free hooked end closed condition. The apparatus includes means to eject the rings, as so hooked, for subsequent disposition, and appropriate use of the so-notched rings.

While a single, specific embodiment of the apparatus and system of the invention has been shown and described in detail, it will be obvious that variations can be effected without departing from the spirit and scope of the invention as defined in, and limited solely by, the appended claims.

We claim:

1. Apparatus for making positive locking circular split sealing rings having interengageable hooking notches in the ends thereof, comprising a hopper for containing a plurality of roughsized and pre-gapped ring blanks, an apertured ring blank carrier plate, means for feeding rough blanks sequentially and separately from the hopper and means for inserting the so-fed ring blanks into spaced sequential apertures in said carrier plate while positively frictionally positioning and engaging a said ring blank in a said aperture, means for clamping the so-positioned and contained ring blanks to the carrier plate within said apertures, plunge cutting means adapted, in a single plunge movement, to cut a hook notch in the upper side of a first end of the ring blank, said plunge cutting means including ganged and unitized plural cutter wheels simultaneously operable to trim a first free terminal end of the ring a predetermined amount, similar plunge cutting means adapted, in a single movement, to hook notch the lower side of a second said free terminal end of the ring utilizing a similar ganged and unitized plural cutter, and simultaneously trim the said second free terminal end of the ring a predetermined amount, means operable for automatically coupling the hook notches in the opposite ring ends, and means to thereafter eject the finished and free end hooked rings into a discharge chute.

2. Apparatus as claimed in claim 1, the first and second said plunge cutting means being respectively disposed proximate opposite faces of a ring to effect the end hook notches in opposed and mateable relationship on the respective ring free terminal ends.

3. Apparatus as claimed in claim 2, wherein said ganged and unitized cutter wheels are disposed at an angle to the longitudinal axis of said ring blanks in said apertures and a said plunge cut forming the said notches with angularly disposed vertical extending faces adapted for mating and coactive positive interlocking of the notches in the ring ends.

4. Appartus as claimed in claim 3, including pivotally mounted arms rotatably mounting said ganged, unitized cutter wheels on free ends thereof, and adapted, upon pivoting tb effect the respective plunge cutting movement of said cutter wheels.

5. Apparatus as claimed in claim 4, including means for controllably and incrementally pivoting said arms to vary downward plunging movement of the cutter wheels to correspond with the axial width of a ring to be trimmed and notched.

6. Apparatus as claimed in claim 5, including means for transversely adjusting mounting position of said cutter wheels on the pivotal arms for positional correlation of the cutter wheels and gaps in said rings as confined and positioned in said apertures.

7. Apparatus as claimed in claims 1, 5, or 6, wherein said apertures in said carrier plate are of non-circular shape and operable upon confinement of a said pregapped ring blank therein, to distort the configuration of said ring, and displace the position and angular disposition of the free terminal ends of the ring, said distortion frictionally binding said ring in said aperture and serving to have the vertical faces of said terminal ends and notches so aligned during cutting that said faces will be substantially parallel with respect to one another when in operating position.

8. Apparatus as claimed in claim 1, said apertured ring blank carrier plate being rotatably mounted, a plurality of operation stations spacedly mounted exteriorally and peripherally around said carrier plate, means for rotating said carrier plate, and indexing means for selectively positioning the said apertures with ring blanks therein at selected ones of said operation stations.

9. Apparatus for making positive locking circular split sealing rings having interengageable hooking notches in the ends thereof comprising a movable ring blank carrier plate, said carrier plate having at least one compressing and restricting shaped rough sized ring blank carrier aperture therein in a spaced array, a plurality of operating stations including a rough ring blank insertion station prior to the first notch cutting station adapted for storage and placement of ring blanks into said apertures, said carrier plate being movable to sequentially dispose said aperture and a ring blank contained therein in a said operating station, a ring blank cutter means in one said operating station, said cutter means consisting of a rotatable unitized ganged plurality of cutting wheels, each having cutting peripheral surfaces thereon, means mounting said cutter for a plunge type movement thereof into a first ring end surface on one ring side, adapted to trim the ring end to a predetermined size and shape and cut a notch into said ring blank during a single plunging motion, a similar cutter means at a subsequent station with the components and motions thereof being reversed with respect to said cutter means at the preceding station and operable to perform a reverse side cutting operation on the second ring end opposite to that on said first ring end, said trimmed ends and notch faces on the respective ends being precisely similar, and disposed at geometrically precise and similar coactive angles whereby said notches constitute opposed and interengageable end hooks on the respective ring ends and a finished ring notched end interengaging and ring discharging operating station having means for so coupling and discharging said rings.

10. Apparatus for making positive locking split circular sealing rings comprising a drivingly rotatably mounted rough ring blank carrier plate, a plurality of spaced ring blank carrier apertures in said carrier plate, a plurality of spaced operating stations including a first station having a rough sized ring blank hopper and feeding device and insertion means to selectively insert rings into said apertures, a second station having operable ring blank left side hook and length cutting means, a third station having operable ring blank right side hook and length cutting means and a fourth station having an operable left and right ring hook coupler and a finished ring ejector.

11. Apparatus as claimed in claim 10, said carrier plate being circular with said apertures radially spaced therein, said operating stations being spacedly positioned and disposed exteriorly of said carrier plate, and means operable for selectively positioning said apertures having ring blanks therein sequentially at said operating stations.

* * * * *